US010138310B2

(12) United States Patent
Mavridis et al.

(10) Patent No.: US 10,138,310 B2
(45) Date of Patent: Nov. 27, 2018

(54) PREPARATION OF LLDPE RESINS AND FILMS HAVING LOW GELS

(75) Inventors: Harilaos Mavridis, Lebanon, OH (US);
Debra L. Beran, Cincinnati, OH (US);
Jeffrey R. Golden, Pearland, TX (US);
Joachim T. M. Pater, Ferrara (IT);
Giampiero Morini, Padua (IT)

(73) Assignee: Equistar Chemicals, LP, Houston, TX (US)

( * ) Notice: Subject to any disclaimer, the term of this patent is extended or adjusted under 35 U.S.C. 154(b) by 563 days.

(21) Appl. No.: 12/806,893

(22) Filed: Aug. 24, 2010

(65) Prior Publication Data

US 2012/0053307 A1 Mar. 1, 2012

(51) Int. Cl.
*C08F 210/16* (2006.01)
*C08F 4/654* (2006.01)
*C08F 2/34* (2006.01)
*C08F 2/38* (2006.01)

(52) U.S. Cl.
CPC .................. *C08F 210/16* (2013.01)

(58) Field of Classification Search
USPC .................. 502/126; 526/204, 209
See application file for complete search history.

(56) References Cited

U.S. PATENT DOCUMENTS

| | | | |
|---|---|---|---|
| 4,298,718 A | 11/1981 | Mayr et al. | |
| 4,302,565 A | 11/1981 | Goeke et al. | |
| 4,399,054 A | 8/1983 | Ferraris et al. | |
| 4,469,648 A | 9/1984 | Ferraris et al. | |
| 4,495,338 A | 1/1985 | Mayr et al. | |
| 4,829,034 A | 5/1989 | Iiskolan et al. | |
| 5,045,401 A * | 9/1991 | Tabor ........................ | B32B 7/12 428/516 |
| 5,100,849 A | 3/1992 | Miya et al. | |
| 5,192,729 A * | 3/1993 | Woo ........................ | C08F 10/02 502/104 |
| 5,221,651 A | 6/1993 | Sachetti et al. | |
| 5,387,749 A | 2/1995 | Govoni et al. | |
| 5,733,987 A | 3/1998 | Covezzi et al. | |
| 5,756,203 A * | 5/1998 | Shirodkar ..................... | 428/339 |
| 6,127,304 A | 10/2000 | Sacchetti et al. | |
| 6,228,956 B1 | 5/2001 | Covezzi et al. | |
| 6,323,152 B1 | 11/2001 | Sacchetti et al. | |
| 6,407,028 B1 | 6/2002 | Sacchetti et al. | |
| 6,420,303 B1 | 7/2002 | Debras et al. | |
| 6,437,061 B1 | 8/2002 | Sacchetti et al. | |
| 6,713,585 B1 * | 3/2004 | Mavridis ............... | B01J 31/0274 502/103 |
| 7,592,286 B2 | 9/2009 | Morini et al. | |
| 2002/0086794 A1 | 7/2002 | Sacchetti et al. | |
| 2006/0089251 A1 * | 4/2006 | Brita et al. .................... | 502/123 |
| 2007/0282083 A1 * | 12/2007 | Baita ........................ | C08F 10/00 526/65 |
| 2012/0010374 A1 | 1/2012 | Brita et al. | |
| 2013/0158214 A1 * | 6/2013 | Pater et al. ................... | 526/110 |

FOREIGN PATENT DOCUMENTS

| | | | | |
|---|---|---|---|---|
| CN | 1798774 A | 7/2006 | | |
| EP | 0526117 A1 * | 2/1993 | ............... | C08K 3/36 |
| JP | 2000512309 A | 9/2000 | | |
| JP | 2012-519217 A | 8/2012 | | |
| JP | 2013536290 A | 9/2013 | | |
| WO | WO 2004106388 A2 * | 12/2004 | ............. | C08F 4/651 |

* cited by examiner

*Primary Examiner* — Fred M Teskin

(57) ABSTRACT

Disclosed is a process for making a linear low density polyethylene (LLDPE) having low gels. The process comprises copolymerizing ethylene with one or more $C_{3-10}$ α-olefins to produce an LLDPE resin which has a gel defect area less than 25 ppm. The copolymerization is performed in the presence of a Ziegler-Natta catalyst which comprises an $MgCl_2$ support, a Ti(IV) complex, and a cyclic ether as an internal electron donor. The Ziegler-Natta catalyst has an Mg/Ti molar ratio greater than or equal to 7.

10 Claims, 1 Drawing Sheet

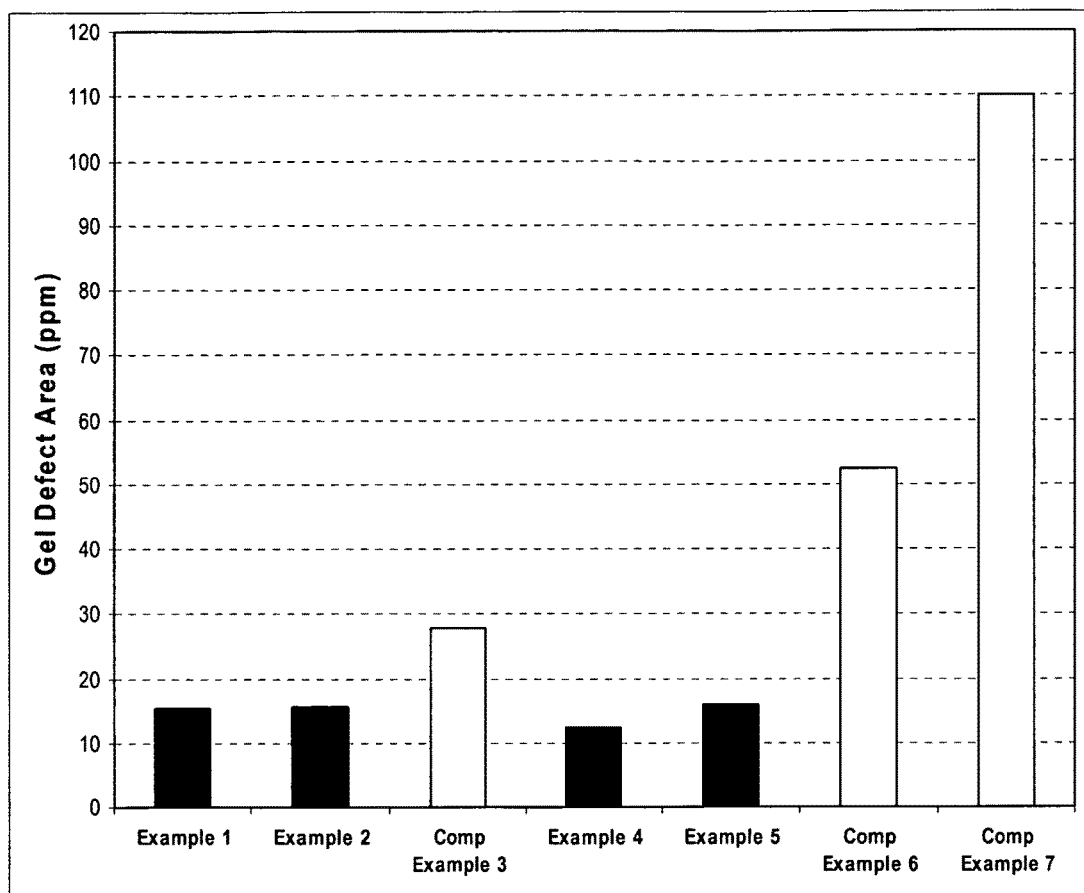

PREPARATION OF LLDPE RESINS AND FILMS HAVING LOW GELS

FIELD OF THE INVENTION

The invention relates to linear low density polyethylene (LLDPE). More particularly, the invention relates to a process for producing LLDPE resins and films having low gels.

BACKGROUND OF THE INVENTION

Polyethylene is divided into high density (HDPE, density 0.941 g/cm$^3$ or greater), medium density (MDPE, density from 0.926 to 0.940 g/cm$^3$), low density (LDPE, density from 0.910 to 0.925 g/cm$^3$) and linear low density polyethylene (LLDPE, density from 0.910 to 0.925 g/cm$^3$). See ASTM D4976-98: Standard Specification for Polyethylene Plastic Molding and Extrusion Materials.

LLDPE is commercially produced via liquid phase processes (solution or slurry) or gas-phase process. Both of the liquid and gas phase processes commonly employ an MgCl$_2$-supported Ziegler-Natta catalyst. LLDPE resins are copolymers of ethylene with from 5 to 10 wt % of α-olefin comonomers such as 1-butene, 1-hexene, and 1-octene. The catalysts are often required to provide LLDPE resins with even comonomer distribution. Comonomer distribution often determines the properties of LLDPE such as tensile properties, impact resistance, and xylene solubles.

The main use of LLDPE is in film applications, including produce bags, garbage bags, stretch wrap, shopping bags, industrial liners, clarity films such as bread bags, and collation shrink films. One challenge facing the industry is reducing the gels in LLDPE. Gels originate from a number of sources, including gels formed by crosslinking reactions during polymerization, insufficient mixing, homogenization during melt blending, and homogenization and crosslinking during film extrusion. Gels in general are undesirable because they affect negatively the film performance and appearance. For example, high gels may cause the film to break in the film production line or during subsequent stretching by converters.

BRIEF DESCRIPTION OF THE DRAWINGS

FIG. 1 shows the gel defect areas of Examples 1, 2, 4, and 5 and Comparative Examples 3, 6, and 7.

SUMMARY OF THE INVENTION

The invention relates to a process for making a linear low density polyethylene (LLDPE) having low gels. The process comprises copolymerizing ethylene with one or more C$_{3-10}$ α-olefins to produce an LLDPE resin which has a gel defect area less than 25 ppm, preferably less than 20 ppm. The gels are measured according to an optical camera-based method. The polymerization is performed in the presence of a Ziegler-Natta catalyst which comprises a MgCl$_2$ support, a Ti(IV) complex, and a cyclic ether as an internal electron donor. Preferably, the cyclic ether is tetrahydrofuran (THF). The Ziegler-Natta catalyst has an Mg/Ti molar ratio greater than or equal to 7. Preferably, the Ti(IV) complex is TiCl$_4$. The supported catalyst is preferably characterized by an X-ray diffraction spectrum which, in the range of 2θ diffraction angles between 5.0° and 20.0°, has at least three main diffraction peaks: 2θ of 7.2±0.2°, and 11.5±0.2° and 14.5±0.2°, respectively. Preferably, the peak at 2θ of 7.2±0.2° is most intense and the peak at 11.5±0.2° has an intensity less than 90% of the intensity of the peak at 2θ of 7.2±0.2°.

DETAILED DESCRIPTION OF THE INVENTION

Suitable Ziegler-Natta catalysts for use in the process of the invention comprise an MgCl$_2$ support, a Ti(IV) complex, and a cyclic ether as an internal electron donor. Preferably, the cyclic ether is tetrahydrofuran (THF). The catalyst has an Mg/Ti molar ratio greater than or equal to 7. Preferably, the catalyst has an Mg/Ti molar ratio within the range of 10 to 100, and more preferably within the range of 10 to 50. The catalyst has a molar ratio of cyclic ether/Ti preferably within the range of 0.5 to 20, more preferably within the range of 5 to 20, and most preferably within the range of 10 to 20. Suitable Ti(IV) complexes are preferably selected from the group consisting of TiX$_4$ and TiX$_n$(OR)$_{4-n}$, wherein X is halogen, R is C$_{1-10}$ alkyl group, and n is a number from 0 to 3. Preferably, X is chlorine. Preferably, the Ti(IV) complex is TiCl$_4$. MgCl$_2$ can be pre-formed or formed during the catalyst preparation. Particularly preferred is the use of MgCl$_2$ in an active form. Using an active form of MgCl$_2$ to support Ziegler-Natta catalysts is known. See, for example, U.S. Pat. Nos. 4,298,718 and 4,495,338. The teachings of these patents are incorporated herein by reference.

One particularly preferred supported catalyst is disclosed in co-pending U.S. application Ser. No. 12/806,892, filed on Aug. 24, 2010. The teachings of the supported catalyst and its preparation of the co-pending application are incorporated herein by reference. The supported catalyst is preferably characterized by an X-ray diffraction spectrum which, in the range of 2θ diffraction angles between 5.0° and 20.0°, has at least three main diffraction peaks: 2θ of 7.2±0.2°, and 11.5±0.2°, and 14.5±0.2°, respectively. Preferably, the peak at 2θ of 7.2±0.2° is most intense and the peak at 11.5±0.2° has an intensity less than 90% of the intensity of the peak at 2θ of 7.2±0.2°.

The general method for the catalyst preparation can also be found from U.S. Pat. No. 7,592,286. The teachings of the '286 patent are incorporated herein by reference. The catalyst is preferably prepared by first contacting the Ti(IV) complex with MgCl$_2$ in the presence of a solvent to obtain an intermediate product. The intermediate product is isolated from the solvent. The intermediate product then contacts with THF. The THF-treated product is washed with the solvent to yield the Ziegler-Natta catalyst. More details of the catalyst preparation is disclosed in the examples of this application.

The copolymerization of ethylene and α-olefins is performed in the presence of the catalyst. Preferably, an alkylaluminum cocatalyst is also used. Suitable alkylaluminum cocatalysts include trialkylaluminums, alkylaluminum halides, the like, and mixtures thereof. Examples of trialkylaluminums include trimethylaluminum (TMA), triethylaluminum (TEAL), triisobutylaluminum (TIBA), tri-n-butylaluminum, tri-n-hexylaluminum, tri-n-octylaluminum, the like, and mixtures thereof. Examples of alkylaluminum halides include diethylaluminum chloride (DEAC), diisobutylalumunum chloride, aluminum sesquichloride, dimethylaluminum chloride (DMAC), the like, and mixtures thereof. TEAL/DEAC and TIBA/DEAC mixtures are particularly preferred. An additional electron donor (i.e., external donor) can also be added to the copolymerization. External donors are preferably selected from the group consisting of ethers, esters, amines, ketones, nitriles, silanes, the like, and mixtures thereof.

Suitable $C_{3-10}$ α-olefins include propylene, 1-butene, 1-hexene, and 1-octene, the like, and mixtures thereof. Preferably, the α-olefin is 1-butene, 1-hexene, or a mixture thereof. The amount of α-olefin used depends on the density of LLDPE desired. Preferably, the α-olefin is used in an amount within the range of 5 to 10 wt % of ethylene. The density of LLDPE is preferably within the range of 0.865 to 0.940 $g/cm^3$, more preferably within the range of 0.910 to 0.940 $g/cm^3$, and most preferably within the range of 0.915 to 0.935 $g/cm^3$.

Preferably, the copolymerization is carried out in one or more polymerization reactors, of which at least one reactor operates in gas phase. The gas phase reactor can be agitated or fluidized. The gas phase polymerization is preferably performed in the presence of hydrogen and hydrocarbon solvents. Hydrogen is used to control the molecular weight of the LLDPE. The LLDPE preferably has a melt index $MI_2$ within the range of 0.1 to 10 dg/min, and more preferably within the range of 0.5 to 8 dg/min. A particularly preferred LLDPE resin is a copolymer of ethylene and 1-butene having 1-butene content within the range of 5 to 10 wt %. The ethylene-1-butene copolymer preferably has a density from 0.912 to 0.925 $g/cm^3$ and, more preferably, from 0.915 to 0.920 $g/cm^3$. The ethylene-1-butene copolymer preferably has an $MI_2$ within the range of 0.5 to 15 dg/min and, more preferably, from 1 to 10 dg/min. Densities and $MI_2$ are determined in accordance with ASTM D1505 and D1238 (condition 190/2.16), respectively.

Preferably, the hydrocarbon solvent has a boiling point higher than the boiling point of ethylene and α-olefin comonomer. Examples of suitable solvents include toluene, xylene, propane, pentane, hexane, the like, and mixtures thereof. The solvent condenses during the polymerization. It thereby removes heat from the polymerization and helps to keep the monomers in the gas phase reactor. Optionally, the gas phase polymerization is performed in the presence of an inert gas such as nitrogen and carbon dioxide.

In one embodiment, the process is performed in a single gas-phase reactor. The catalyst is continuously fed to the reactor, either directly, or through one or more pre-activation devices. Monomers and other components are continuously fed into the reactor to maintain the reactor pressure and gas phase composition essentially constant. A product stream is continuously withdrawn from the reactor. The LLDPE is isolated from the product stream and the unreacted monomers and other components are recycled. A fluidization compressor is often used to circulate the gas contained in the reactor, at such a recirculation velocity that the polymeric bed is maintained in the fluidized state.

In another embodiment, the process is performed in two gas-phase reactors in series. The catalyst is continuously fed to the first reactor, either directly, or through one or more pre-activation devices. The gas phase of the first reactor preferably comprises ethylene, one or more α-olefin comonomers, hydrogen, and a hydrocarbon solvent. Monomers and other components are continuously fed to the first reactor to maintain the reactors pressure and gas phase composition essentially constant. A product stream is withdrawn from the first gas phase reactor and fed to the second. The gas phase in the second reactor preferably differs from the first reactor so that the LLDPE made in the second reactor differs from the LLDPE made in the first reactor in either composition or molecular weight, or both. The end-product stream, which comprises the LLDPE made from the first and the second reactors, is withdrawn from the second reactor.

The invention includes LLDPE made by the process. The LLDPE of the invention has a gel defect area less than or equal to 25 ppm, preferably less than or equal to 20 ppm. It has a density within the range of 0.910 to 0.940 $g/cm^3$ and a melt index ($MI_2$) within the range of 0.1 to 10 dg/min. The LLDPE of the invention can be used in many applications, including films, pipes, containers, adhesives, wire and cable, and molding parts. LLDPE having low gels is particularly useful for film applications. It allows the film to be stretched thinner without breaking. More particularly, the LLDPE of the invention is suitable for stretch wrap, clarity film such as bread bags, and shrink film applications in which the gel particles have significant impact on the film appearance, processing, and physical properties.

Methods for making LLDPE films are known. For example, the blown film process can be used to produce biaxially oriented shrink films. In the process, LLDPE melt is fed by an extruder through a die gap (0.025 to 0.100 in) in an annular die to produce a molten tube that is pushed vertically upward. Pressurized air is fed to the interior of the tube to increase the tube diameter to give a "bubble." The volume of air injected into the tube controls the size of the tube or the resulting blow-up ratio, which is typically 1 to 3 times the die diameter. In low stalk extrusion, the tube is rapidly cooled by a cooling ring on the outside surface and optionally also on the inside surface of the film. The frost line height is defined as the point at which the molten extrudate solidifies. This occurs at a height of approximately 0.5-4 times the die diameter. The draw down from the die gap to the final film thickness and the expansion of the tube diameter result in the biaxial orientation of the film that gives the desired balance of film properties. The bubble is collapsed between a pair of nip rollers and wound onto a film roll by the film winder. Collapsing of the tube is done after initial cooling at a point so that the wall surfaces will not adhere to one another.

Blown films for the examples of Table 1 are produced on a blown film line equipped with a 2" diameter smooth-bore extruder, 24:1 L/D barrier screw and a 4" diameter spiral mandrel die with a 0.100" die gap. Blown film fabrication conditions include an output rate of 63 lb/hr, melt temperature of 215-220° C., Blow-Up-Ratio of 2.5, frostline height of 12" and film thickness of 1 mil (25 microns).

Dart Drop Impact, Elmendorf Tear, Haze and Clarity (NAS or Narrow-Angle-Scattering) are measured per ASTM D1709, D1922, D1003 and D1746, respectively.

Gels in the films are measured with an optical scanning camera system mounted directly on the blown film line between the collapsing tower and the film winder. The film thickness is set to 50 microns (2 mil) during the gel measurement period and the optical scan is performed through the collapsed tubing, effectively scanning through two layers of the film for a total of 100 microns (4-mil). The gel measurement system used, including hardware and software, is a commercially available system provided by OCS GmbH, the Optical Control Systems film scanning system FS-5. FS-5 consists of a special high-speed digital area sensor and a lighting unit located in a separate protective housing. Transmission light is used to inspect transparent material, with the area sensor and the lighting unit installed opposite one another, inspecting the film which runs between them. The system facilitates the recognition of gels as optically recognizable defects in the film. The gels are distributed into predetermined class sizes. The defects are then assigned to the respective section of the strips. Software settings for the OCS gel analysis software are:

---

Camera: Pixels per line: 4096, Lines per frame: 256, Resolution:
X-Axis 59 μm, Y-Axis 63 μm, Offsets: Left: 416 pixels, Right: 464 pixels
  Search Distance: Distance [Pixel]: 5, Maximum Pixel: 0
  Level
    1. Level neg.: 50
    2. Level neg.: 5
    Type of defects: contaminations with two levels
  Shape Factors
    Count: 3
    Shape factor 1: 1.5
    Shape factor 2: 2.5
  Size Classes
    Count: 5
    Class 1: 100
    Class 2: 200
    Class 3: 400
    Class 4: 800
    Class 5: 1600
  Grabber
    Shading correction    Mode: automatic    Interval [mm]: 1000
    Brightness: automatic    Buffer size: 32
    Grey value: 170
    Matrix size  X-Axis [Pixel]: 11
    Y-Axis [Pixel]: 11
  Filter
    Parcel length [mm]: 96.768
    Mean filter size: 50
  Lanes
    Count: 10
  Limits
    Limit mode: classical
    Classical limits    Minimum level: Level 0
    Ratio level 1/Level 0: 0.5
  Counter Mode
    Area [m$^2$]: 28.0
    Start delay [s]: 0
  Special defects
    Count: 1

---

A standard report from the OCS gel analysis includes the number of gels or defects per unit area of the inspected film for each gel size of "defect size class." For example, in Table 1 the gel size classes are <100 microns, 100-200, 200-400, 400-800 and 800-1600 microns. The sum total of the cross sectional area of all gels, divided by the total area of inspected film, is also calculated and provided by the software as a "gel defect area," a dimensionless ratio in units of parts-per-million. The "gel defect area" is used herein as a quantitative measure of the gels in the film.

The following examples merely illustrate the invention. Those skilled in the art will recognize many variations that are within the spirit of the invention and scope of the claims.

Examples 1-2

A Ziegler-Natta catalyst is prepared as follows.

An initial amount of microspheroidal $MgCl_2 \cdot 2.8C_2H_5OH$ is prepared according to the method described in Example 2 of WO98/44009 but operating on a larger scale. The stirring conditions during the preparation are adjusted to obtain the desired average particle size. The microspheroidal $MgCl_2$-EtOH adduct is subjected to a thermal treatment under nitrogen stream over a temperature range of 50-150° C. to reduce the alcohol content. The adduct contains 28.5 wt % of EtOH and has an average particle size of 23 microns.

A 500 mL four-necked round flask is purged with nitrogen, charged with 250 mL of $TiCl_4$ at 0° C., and then charged with 10 grams of the above-described adduct under stirring. The temperature is raised to 130° C. and maintained at that temperature for 2 hours. The stirring is discontinued, the solid product is allowed to settle, and the supernatant liquid is siphoned off. An additional amount of $TiCl_4$ is added to the flask to reach the initial liquid volume. The temperature is maintained at 110° C. for 1 hour. Again, the solid is allowed to settle, and the liquid is siphoned off. The solid is then washed three times with anhydrous hexane (100 mL at each washing) at 60° C. and twice at 40° C. Finally, the solid intermediate component is dried under vacuum and analyzed. It contains 4.2 wt % of Ti and 20.5 wt % of Mg.

A 500 mL four-necked round flask equipped with a mechanical stirrer is purged with nitrogen and charged with 300 mL of anhydrous hexane and 21 g of the solid intermediate at room temperature. Under stirring, THF is added dropwise in an amount to have a molar ratio Mg/THF=1.25. The temperature is raised to 50° C. and the mixture is stirred for 2 hours. The stirring is discontinued and the solid product is allowed to settle and the supernatant liquid is siphoned off. The solid is washed twice with anhydrous hexane (100 mL each time) at 40° C., recovered, and dried under vacuum.

A 350 mL four-necked round flask is purged with nitrogen and charged with 280 mL of heptane and 19.8 g of the above solid at 25° C. Under stirring, the temperature is raised to 95° C. in about 30 minutes and maintained for 2 hours. The temperature is then cooled to 80° C., and the stirring is discontinued. The solid product is allowed to settle for 30 minutes and the supernatant liquid is siphoned off.

The X-ray spectrum of the solid shows in the range of 2θ diffraction angles between 5° and 20° one main diffraction line at diffraction angles 2θ of 7.2° (100), 8.2° (40), 11.5° (60), side peak at 14.5° (15), and an additional side peak at 18° (25); the numbers in brackets represent the intensity $I/I_o$ with respect to the most intense line. The solid catalyst has 15.7% of Mg, 1.6% of Ti, 31.1% of THF, an Mg/THF ratio of 1.49, and an Mg/Ti ratio of 19.1.

An LLDPE (ethylene-1-butene copolymer) is made in a gas phase polymerization process. The process uses a single fluidized bed reactor equipped with a gas recirculation compressor. The gas phase of the reactor is recycled with such a velocity that the polymeric bed in the reactor is kept in fluidized conditions. The gas phase comprises ethylene, 1-butene, hydrogen, nitrogen and isopentane. The ethylene concentration is controlled to have a high polymerization rate while maintaining polymer morphology (fines formation, sheeting, chunks formation, etc.), and is kept at about 30 mol %. The 1-butene to ethylene ratio is controlled in such a way that the density of the formed polymer is on target. The hydrogen to ethylene ratio is controlled in such a way that the molecular weight or $MI_2$ of the formed polymer is on target.

The above-mentioned catalyst is fed continuously to a preactivation section, where the catalyst is contacted with trihexylaluminum and diethylaluminum chloride. From the pre-activation section, the catalyst is continuously fed to said gas phase reactor. Apart from the pre-activated catalyst, triethylaluminum is continuously fed to the polymerization reactor system. The pressure in the reactor is kept at about 22 barg, while the polymerization temperature in the reactor is controlled to be 86° C. The LLDPE polymer is withdrawn from the reactor bed and degassed.

The LLDPE has a gel defect area of 15 ppm for Example 1 and 16 ppm for Example 2. Other resin and film properties are listed in Table 1.

Comparative Example 3

An LLDPE is made by a Ziegler-Natta catalyst having an Mg/Ti molar ratio of about 5.8 measured according to ICP metal analysis of the polymer. The LLDPE has a gel defect area of 28 ppm. Other resin and film properties are listed in Table 1.

Examples 4-5

Example 4 and 5 are made as Examples 1 and 2. Slip and antiblock are also added into the resin powder during finishing and pelletization. Examples 4 and 5 have a gel defect area of 12 ppm and 16 ppm, respectively. Other resin and film properties are listed in Table 1.

Comparative Examples 6-7

Comparative Examples 6 and 7 are made as Comparative Example 3. Slip and antiblock are also added into the resin powder during finishing and pelletization. Examples 6 and 7 have a gel defect area of 53 ppm and 110 ppm, respectively. Other resin and film properties are listed in Table 1.

TABLE 1

Resin, film and gel properties

|  | Example 1 | Example 2 | Comp Example 3 | Example 4 | Example 5 | Comp Example 6 | Comp Example 7 |
|---|---|---|---|---|---|---|---|
| Melt Index (2.16 kg, 190° C.) | 0.87 | 0.91 | 1.09 | 1 | 0.96 | 1.01 | 0.92 |
| Base resin density (g/cc) | 0.918 | 0.919 | 0.919 | 0.919 | 0.919 | 0.919 | 0.919 |
| I21.6/I2.16 Ratio | 27.3 | 26.7 | 26.3 | 26.7 | 26.9 | 26.7 | 26.5 |
| Slip (ppm) | No | No | No | 900 | 900 | 900 | 900 |
| Antiblock (talc, ppm) | No | No | No | 5700 | 5700 | 6100 | 8000 |
| Dart Drop Impact (g) | 94 | 97 | 103 | 85 | 88 | 88 | 97 |
| Elmendorf Tear, MD (g) | 100 | 100 | 110 | 90 | 100 | 95 | 100 |
| Elmendorf Tear, TD (g) | 400 | 390 | 360 | 380 | 390 | 340 | 340 |
| Haze (%) | 8.1 | 8.6 | 10.5 | 16.3 | 16.6 | 19.5 | 21.3 |
| Clarity (NAS, %) | 80 | 78 | 80 | 19 | 19 | 16 | 10 |
| Gel defect area (ppm) | 15 | 16 | 28 | 12 | 16 | 53 | 110 |
| Number of gels per m² |  |  |  |  |  |  |  |
| Gel size <100 microns | 353 | 375 | 318 | 874 | 855 | 1849 | 1351 |
| Gel size 100-200 microns | 180 | 185 | 186 | 177 | 189 | 674 | 706 |
| Gel size 200-400 microns | 79 | 82 | 115 | 44 | 65 | 268 | 435 |
| Gel size 400-800 microns | 16 | 15 | 40 | 8 | 15 | 46 | 170 |
| Gel size 800-1600 microns | 2 | 2 | 7 | 1 | 2 | 6 | 28 |

What is claimed is:

1. A process for making a linear low density polyethylene resin comprising the steps of:
    copolymerizing ethylene with a comonomer selected from 1-butene and 1-hexene, and wherein the comonomer used in an amount within the range of 5-10% by weight of ethylene to produce a linear low density polyethylene;
    wherein the copolymerizing step is performed in the presence of hydrogen, an inert gas selected from nitrogen and carbon dioxide, and
        a Ziegler-Natta catalyst comprising:
            a $MgCl_2$ support,
            a Ti(IV) complex, and
            an internal electron donor comprising a cyclic ether; and
        wherein Ziegler-Natta catalyst is formed by first contacting the $MgCl_2$ support with the Ti(IV) complex to form an intermediate product, and the intermediate product is then contacted with the internal electron donor to produce the Ziegler-Natta catalyst;
    wherein the Ziegler-Natta catalyst has an Mg/Ti molar ratio greater than or equal to 7, and an internal electron donor/Ti molar ratio between 5 and 20; and
    wherein the linear low density polyethylene resin has a gel defect area less than or equal to 25 ppm;
    wherein the catalyst is characterized by an X-ray diffraction spectrum which, in the range of 2θ diffraction angles between 5.0° and 20.0°, has at least three main diffraction peaks: 2θ of 7.2±0.2°, 11.5±0.2°, and 14.5±0.2°; and
    wherein the peak at 2θ of 7.2±0.2° is most intense and the peak at 11.5±0.2° has an intensity less than 90% of the intensity of the peak at 2θ of 7.2±0.2°.

2. The process of claim 1, wherein the Ti(IV) complex is $TiCl_4$.

3. The process of claim 1, wherein the Mg/Ti molar ratio is within the range of 10 to 100.

4. The process of claim 3, wherein the Mg/Ti molar ratio is within the range of 10 to 50.

5. The process of claim 1, wherein the cyclic ether is tetrahydrofuran.

6. The process of claim 1, wherein the copolymerization step is performed in the gas phase.

7. The process of claim 1, wherein the comonomer is 1-butene.

8. The process of claim 1, wherein the linear low density polyethylene has a density within the range of 0.910 to 0.940 $g/cm^3$ and a melt index ($MI_2$) within the range of 0.1 to 10 dg/min.

9. The process of claim 8, wherein the linear low density polyethylene has a density within the range of 0.915 to 0.935 $g/cm^3$ and an $MI_2$ within the range of 0.5 to 8 dg/min.

10. The process of claim 1, further comprising forming a film using a blown film process from the linear low density polyethylene, wherein the film comprises one or more additives selected from a slip agent and an antiblock agent, and wherein the film has a gel defect area less than or equal to 16 ppm.

* * * * *

UNITED STATES PATENT AND TRADEMARK OFFICE
CERTIFICATE OF CORRECTION

Page 1 of 1

PATENT NO. : 10,138,310 B2
APPLICATION NO. : 12/806893
DATED : November 27, 2018
INVENTOR(S) : Mavridis et al.

It is certified that error appears in the above-identified patent and that said Letters Patent is hereby corrected as shown below:

In the Specification

In Column 2, Line 51, delete "is" and insert -- are --
In Column 2, Line 62, delete "diisobutylalumunum" and insert -- diisobutylaluminum --
In Column 4, Line 34, delete "result" and insert -- results --
In Column 4, Line 56, delete "(4-mil)." and insert -- (4 mil). --

Signed and Sealed this
Eighteenth Day of January, 2022

Drew Hirshfeld
*Performing the Functions and Duties of the
Under Secretary of Commerce for Intellectual Property and
Director of the United States Patent and Trademark Office*